No. 839,990. PATENTED JAN. 1, 1907.
A. L. COX.
LOAD BINDER.
APPLICATION FILED APR. 24, 1906.
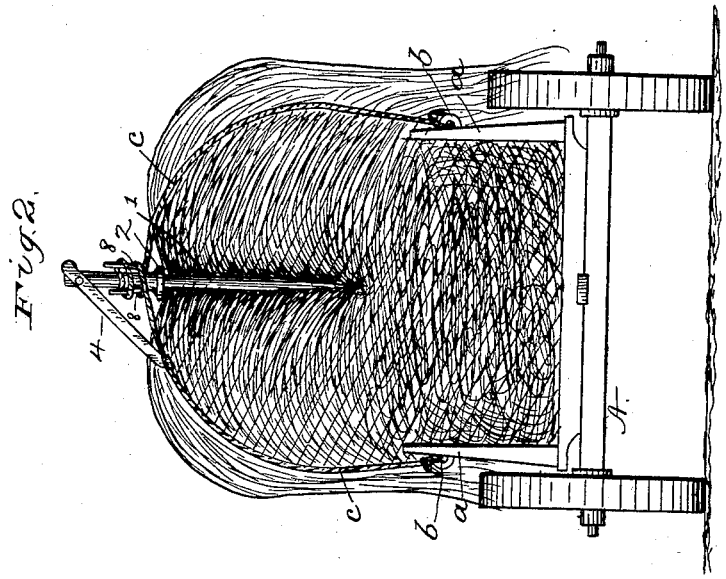
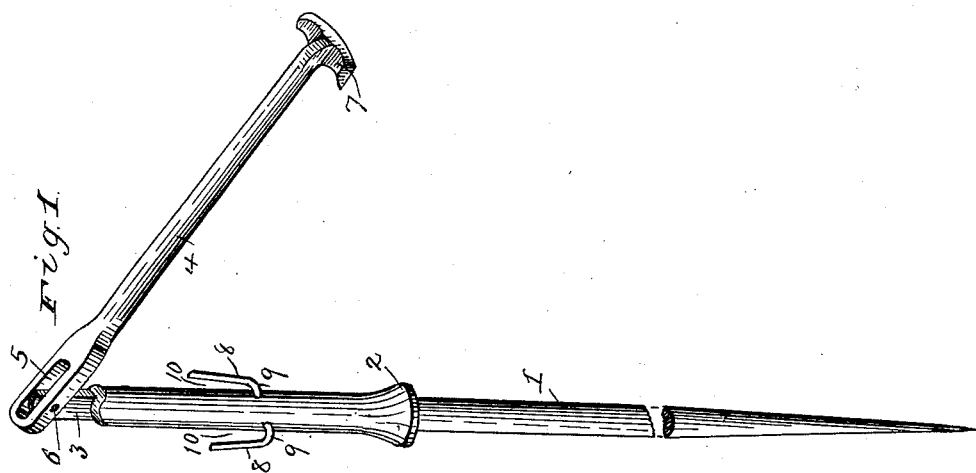
Witnesses
W. Rees Edelen
John Downs
Inventor
A. L. Cox
By Shepherd & Parker
Attorneys

UNITED STATES PATENT OFFICE.

ALVIN L. COX, OF MADISON, MISSOURI.

LOAD-BINDER.

No. 839,990.  Specification of Letters Patent.  Patented Jan. 1, 1907.

Application filed April 24, 1906. Serial No. 313,391.

*To all whom it may concern:*

Be it known that I, ALVIN L. COX, a citizen of the United States, residing at Madison, in the county of Monroe and State of Missouri, have invented certain new and useful Improvements in Load-Binders, of which the following is a specification.

This invention relates to new and useful improvements in load-binders, and contemplates the provision of a binder of that type in which a pointed stake is employed and is provided with means for increasing the tension of the binding-ropes.

In connection with a device of this type it is a primary object of the present invention to provide novel means for grasping and holding the ropes in twisted relation.

The detailed construction will appear in the course of the following description, in which reference is had to the accompanying drawings, forming a part of this specification, like characters designating like parts throughout both views, wherein—

Figure 1 is a perspective view of the load-binder; and Fig. 2 is a rear elevation of a wagon with a load of hay, straw, or the like indicated in section thereon, illustrating the mode of use of the present invention.

In the practical embodiment of my invention I employ a hay-wagon A of conventional form, which is provided with corner-standards $a$. The standards $a$ are formed with staples $b$, to which are secured the ends of binding-ropes $c$, extending diagonally over the load and between a pair of corner-standards on opposite sides of the wagon. The binding-ropes $c$ intersect one another at a point approximately central of the load and in this disposition are tightened in a manner to be described. The invention comprises a pointed stake 1, provided with an enlarged abrupt head 2, which at its upper end is formed with a portion of reduced diameter 3. An arm 4 is formed at its one end with an elongated slot 5, which passes over the reduced portion 3 of the stake 1 and is pivoted thereto, as indicated at 6. The arm 4 is provided at its free end with laterally-extending hooked lips 7. In the upper portion of the stake 1, above the enlarged head 2 thereof, a plurality of suitably-arranged tines 8 are provided. The tines 8 extend upwardly in approximately parallel relation to the stake 1 and are formed with angularly-extending ends 9, which project into the stake 1 and are suitably secured therein, so as to maintain the tines 8 rigid from twisting under the bight of the ropes $c$.

In practical use the load is supported upon the wagon, as shown in Fig. 2, the pointed stake 1 is inserted into the hay or other like material until the head 2 engages the hay and limits the further movement of the stake 1 therein. In this action the ropes $c$, adjacent their point of intersection, are received in the spaces 10 between the stake 1 and the tines 8. In this disposition of the parts the stake 1 is rotated by manually turning the lever 4, and the slack of the ropes $c$ is taken up. These ropes will twist about the stake 1 exteriorly of the tines 8 until the tension of said ropes prevent the further rotation of said stake. The arm 4 is then swung downwardly upon its pivot and one of the lips 7 passed beneath the adjacent rope $c$ and held thereby in substantially interlocked relation, and the stake is prevented from twisting under the torsional strain of the ropes $c$.

It is obvious that various minor changes may be made within the scope of the invention as defined in the appended claim.

Having fully described my invention, I claim—

A load-holding device comprising a pointed stake and a plurality of upwardly-extending offset tines carried thereby and arranged in spaced parallel relation thereto.

In testimony whereof I affix my signature in presence of two witnesses.

ALVIN L. COX.

Witnesses:
ARTHUR DRY,
S. H. FARRELL.